(12) United States Patent
Wiley et al.

(10) Patent No.: US 9,952,386 B2
(45) Date of Patent: Apr. 24, 2018

(54) MULTI-ELECTRODE SYSTEM WITH VIBRATING ELECTRODES

(71) Applicant: 3SAE Technologies, Inc., Franklin, TN (US)

(72) Inventors: Robert G. Wiley, Franklin, TN (US); Brett Clark, Whites Creek, TN (US); Jared C. Meitzler, Spring Hill, TN (US); Clyde J. Troutman, Spring Hill, TN (US)

(73) Assignee: 3SAE TECHNOLOGIES, INC., Franklin, TN (US)

( * ) Notice: Subject to any disclaimer, the term of this patent is extended or adjusted under 35 U.S.C. 154(b) by 0 days.

(21) Appl. No.: 15/496,688

(22) Filed: Apr. 25, 2017

(65) Prior Publication Data

US 2017/0261688 A1 Sep. 14, 2017

Related U.S. Application Data

(63) Continuation of application No. 15/193,884, filed on Jun. 27, 2016, now Pat. No. 9,632,252, which is a continuation of application No. 14/798,794, filed on Jul. 14, 2015, now Pat. No. 9,377,584, which is a continuation of application No. 14/276,684, filed on
(Continued)

(51) Int. Cl.
*G02B 6/255* (2006.01)
*C03B 37/15* (2006.01)
*C03B 25/02* (2006.01)

(52) U.S. Cl.
CPC ............ *G02B 6/2553* (2013.01); *C03B 25/02* (2013.01); *C03B 37/15* (2013.01); *G02B 6/2551* (2013.01); *G02B 6/2556* (2013.01)

(58) Field of Classification Search
None
See application file for complete search history.

(56) References Cited

U.S. PATENT DOCUMENTS 2,817,695 A   12/1957   Hartwig
3,761,764 A   9/1973    Brady
(Continued)

FOREIGN PATENT DOCUMENTS

CN   1213316    8/2005
CN   101652687  2/2010
(Continued)

OTHER PUBLICATIONS

Office Action dated May 13, 2016 in corresponding European Application No. 08729281.9.
(Continued)

*Primary Examiner* — Chad H Smith

(57) ABSTRACT

A multi-electrode system includes a fiber holder that holds at least one optical fiber, a plurality of electrodes arranged to generate a heated field to heat the at least one optical fiber, and a vibration mechanism that causes at least one of the electrodes from the plurality of electrodes to vibrate. The electrodes can be disposed in at least a partial vacuum. The system can be used for processing many types of fibers, such processing including, as examples, stripping, splicing, annealing, tapering, and so on. Corresponding fiber processing methods are also provided.

18 Claims, 15 Drawing Sheets

Related U.S. Application Data

May 13, 2014, now Pat. No. 9,086,539, which is a continuation of application No. 13/185,223, filed on Jul. 18, 2011, now Pat. No. 8,721,196, which is a continuation of application No. 12/688,489, filed on Jan. 15, 2010, now Pat. No. 7,985,029, which is a continuation-in-part of application No. 12/027,394, filed on Feb. 7, 2008, now Pat. No. 7,670,065.

(60) Provisional application No. 60/976,859, filed on Oct. 2, 2007, provisional application No. 60/953,803, filed on Aug. 3, 2007, provisional application No. 60/888,691, filed on Feb. 7, 2007.

(56) References Cited

U.S. PATENT DOCUMENTS

| | | |
|---|---|---|
| 3,886,343 A | 5/1975 | Desautels et al. |
| 3,960,531 A | 6/1976 | Kohanzadeh et al. |
| 4,049,414 A * | 9/1977 | Smith .................. G02B 6/2551 219/383 |
| 4,810,054 A * | 3/1989 | Shinbori .............. G02B 6/2551 219/121.46 |
| 5,018,824 A | 5/1991 | Ooe et al. |
| 5,560,760 A | 10/1996 | Toeppen |
| 5,777,867 A | 7/1998 | Hongu et al. |
| 6,207,922 B1 | 3/2001 | Dumitriu et al. |
| 6,742,939 B2 | 6/2004 | Sykora et al. |
| 6,886,998 B2 | 5/2005 | Kasuu et al. |
| 7,670,065 B2 | 3/2010 | Clark et al. |
| 7,922,400 B2 | 4/2011 | Clark et al. |
| 7,985,029 B2 | 7/2011 | Wiley et al. |
| 8,721,196 B2 | 5/2014 | Wiley et al. |
| 9,079,267 B2 | 7/2015 | Yoshida et al. |
| 9,086,539 B2 | 7/2015 | Wiley et al. |
| 9,377,584 B2 | 6/2016 | Wiley et al. |
| 2002/0136490 A1 | 9/2002 | Zhang et al. |
| 2002/0176673 A1 | 11/2002 | Kasuu et al. |
| 2003/0056547 A1 | 3/2003 | Yamada et al. |
| 2005/0223748 A1* | 10/2005 | Ames .................. C03B 23/045 65/407 |
| 2006/0263016 A1 | 11/2006 | Wiley et al. |
| 2007/0031098 A1 | 2/2007 | Wiley et al. |
| 2008/0187273 A1 | 8/2008 | Clark et al. |
| 2010/0135621 A1 | 6/2010 | Wiley et al. |
| 2010/0226613 A1 | 9/2010 | Clark et al. |
| 2013/0126502 A1 | 5/2013 | Yoshida et al. |

FOREIGN PATENT DOCUMENTS

| | | |
|---|---|---|
| EA | 0503172 | 9/1992 |
| EP | 0262303 | 4/1988 |
| EP | 2524255 | 11/2012 |
| JP | 5217039 | 2/1977 |
| JP | 5591507 | 6/1980 |
| JP | 5678812 | 6/1981 |
| JP | 27006 | 1/1990 |
| JP | 02287409 | 11/1990 |
| JP | 570166 | 3/1993 |
| JP | 05333227 | 12/1993 |
| JP | H05333227 | 12/1993 |
| JP | 111160565 | 6/1999 |
| JP | 2001124949 | 5/2001 |
| JP | 2001166175 | 6/2001 |
| JP | 200222898 | 1/2002 |
| JP | 2005263523 | 9/2005 |
| TW | 244338 | 4/1995 |
| WO | 2008098119 | 8/2008 |
| WO | 2011087508 | 7/2011 |

OTHER PUBLICATIONS

Canadian Office Action dated Mar. 8, 2017 issued in corresponding Canadian Application No. 2677794.
Examiner's Report dated Dec. 20, 2016 issued in corresponding European Application No. 10843374.9.
Examiner's Report dated Nov. 27, 2015 issued in corresponding Canada Patent Application Serial No. 2786344.
Examiners Report dated Dec. 19, 2016 issued in corresponding Canadian Application No. 2,786,344.
Extended European Search Report dated Apr. 10, 2015 issued in corresponding European Application No. 10843374.9.
Extended European Search Report dated Apr. 23, 2014 issued in corresponding European Application No. 08729281.9.
Furukawa Electric, Fusion Splicers and Tools, FITEL, 3:1-32 (2009).
Halfpenny et al., Electric-arc cleaning of optical-fiber endfaces, Applied Optics, 35(22)4516-4517 (1996).
International Search Report and Written Opinion dated Jan. 20, 2014, issued in corresponding International Application No. PCT/US2013/035665.
International Search Report dated Aug. 30, 2010 issued in corresponding International Application No. PCT/US2010/021197.
International Search Report dated Jun. 27, 2008 issued in corresponding International Application No. PCT/US2008/053305.
Japanese Office Action dated Mar. 13, 2012 issued in corresponding JP Application No. 2009-549238.
Office Action dated Feb. 13, 2018 in corresponding European Application No. 08729281.9.

* cited by examiner

MULTI-ELECTRODE SYSTEM WITH VIBRATING ELECTRODES

CROSS REFERENCES TO RELATED APPLICATIONS

This application is a continuation of U.S. non-provisional patent application Ser. No. 15/193,884, filed Jun. 27, 2016, entitled Multi-Electrode System with Vibrating Electrodes, which is a continuation of U.S. non-provisional patent application Ser. No. 14/798,794, filed Jul. 14, 2015, entitled Multi-Electrode System with Vibrating Electrodes, which is a continuation of U.S. non-provisional patent application Ser. No. 14/276,684, filed May 13, 2014, now U.S. Pat. No. 9,086,539, issued on Jul. 21, 2015, entitled Multi-Electrode System with Vibrating Electrodes, which is a continuation application of U.S. non-provisional patent application Ser. No. 13/185,223, filed Jul. 18, 2011, now U.S. Pat. No. 8,721,196, issued on May 13, 2014, entitled Multi-Electrode System with Vibrating Electrodes, which is a continuation application of U.S. non-provisional patent application Ser. No. 12/688,489, filed Jan. 15, 2010, now U.S. Pat. No. 7,985,029, issued on Jul. 26, 2011, entitled Multi-Electrode System with Vibrating Electrodes, which is a continuation-in-part application of U.S. non-provisional patent application Ser. No. 12/027,394 filed Feb. 7, 2008, now U.S. Pat. No. 7,670,065, issued on Mar. 2, 2010, entitled Multi-Electrode System, which claimed priority under 35 U.S.C. §119(e) from, commonly owned U.S. provisional patent application Ser. No. 60/976,859 filed Oct. 2, 2007, entitled Multi-Electrode System In A Vacuum, U.S. provisional patent application Ser. No. 60/953,803 filed Aug. 3, 2007, entitled Three-phase Arc for Fiber Splicing and Improved Fiber Stripping, and U.S. provisional patent application Ser. No. 60/888,691 filed Feb. 7, 2007, entitled Three-Phase Arc for Large Diameter Fiber Splicing and Improved Fiber Stripping, the disclosure of each of which is incorporated herein in its entirety by reference.

FIELD OF INTEREST

The present inventive concepts relate to the field of fiber optics, and more particularly to systems and methods for splicing and stripping optical fibers.

BACKGROUND

Optical fiber fusion splicers commonly employ an electrical discharge to heat the fibers sufficiently for them to be fused together. This electrical discharge is known in the industry as an "arc". However, according to some sources, a discharge of this current level is not a true arc, but a coronal discharge that generates a hot plasma field.

Recently, arcs of the same type have been adapted for use in stripping coatings from fibers and cleaning residual debris from mechanically stripped fibers. In FIG. 1A, the arc 106 is formed between sharply pointed tips of a pair of electrodes 102, 104 to heat a fiber 110, where the electrodes 102, 104 are spaced 1 mm to 10 mm apart, as is known. As shown in FIG. 1B, larger electrode spacing is required to generate an arc 126 for splicing multiple fibers at once (e.g., fiber ribbons), and for larger diameter fibers 130. The optical design of some splicers can also require the electrode spacing "gap" to be larger in order to prevent the electrodes 122, 124 from physically occluding the optical fiber path.

The electrodes are commonly made of tungsten. Although, in some cases, cerium or thorium are alloyed with the tungsten. These elements lower the thermionic work function of the electrode, which causes electrons to more readily leave the surface of the electrode. This allows the discharge to be initiated with a lower initial voltage. Alternatively, an external source of ions can be provided to assist in initiating the arc (e.g., Ion Enhanced Cold Plasma technology by 3SAE Technology, Inc.). It is possible to provide a suitable arc with ordinary steel electrodes and with no external ionization, but the repeatability of the arc characteristics is typically poor.

The voltage applied to the electrodes can be DC (typically in conjunction with smaller electrode spacing) or AC (which allows a larger spacing between the electrode tips—up to 10 mm or more). The voltage required to initiate the discharge is determined by Paschen's Law, which relates the breakdown voltage of a gap between electrodes to a (complex and non-linear) function of the gas present in the gap (e.g., typically ordinary air), pressure, humidity, electrode shape, electrode material, and gap distance. Many of the parameters required to apply Paschen's Law to this system are not known, so little quantitative theoretical analysis of splicer arcs has been done. Typically, the initiating voltage is determined experimentally to be in the range of 5 kV to 30 kV.

Once the arc has been initiated, sustained ionization of the plasma in the discharge requires a lower voltage than initially applied. The impedance (i.e., the ratio of applied voltage to current) of the plasma as a circuit element is difficult to predict. Splicer arcs are suspected to exhibit negative impedance at some frequencies and current levels. These characteristics make "constant voltage" operation of a splicer arc very difficult to achieve. Therefore, most of such systems are controlled to provide a constant average current. This correlates in a reasonably predictable way with the observed power delivered to the discharge and the resulting temperature of the fibers.

It is useful to provide a means of varying the arc power delivered to the fibers, in order to provide correct heating for different fiber types, and to compensate for differing conditions. This can be done by altering the current delivered to the sustained arc (with the control circuit mentioned above) or by pulsing the arc on and off.

Most common optical fibers are 80 μm to 125 μm in diameter (not including outer coatings), such as that shown in FIG. 1A. However, some applications, such as high-power fiber lasers, require fibers up to 1 mm or more in diameter. Most fusion splicers will not accept fibers greater than 200 μm in diameter. Specialty splicers exist for Large Diameter Fibers (LDF), with various maximum diameter capabilities, depending on design features.

Successful splicers for the larger end of the LDF (>600 μm) spectrum have typically used resistive filament heating or laser heating rather than an arc. For these large fibers, the dielectric nature of the fiber material can cause an arc to curve around the fiber, rather than enveloping the entire circumference of the fiber in the plasma field, as shown in FIG. 1B. This causes uneven heating of the fiber, with resulting poor splice quality.

Devices which use arcs to strip fibers can also suffer from uneven heating effects. These "arc strippers" typically place the fiber just outside the plasma field (above or below), so that heat from the arc causes decomposition of the coating. This necessarily causes the fiber to be hotter on one side than the other. For most coatings, this is not a problem. However, some coatings have a relatively narrow temperature window for effective removal and could benefit from more even heat distribution.

SUMMARY OF INVENTION

Provided are systems and methods using multiple electrodes to generate arcs used for thermal processing of one or more optical fibers, including, but not limited to: splicing, annealing, diffusion, stripping, tapering, and ablation, or combinations thereof. Such systems and methods can also be useful in other applications and contexts, such as for making optical fiber couplings. Such multiple electrode systems and methods can employ vibration of one or more of the multiple electrodes to broaden the plasma field, while continuing to maintain sufficient power to perform the above functions.

In accordance the present invention, a multi-electrode system can be a three phase system configured to operate in ambient conditions, or in a partial or complete vacuum, with vibration or isolation of one or more of the multiple electrodes. There are several benefits of such systems and methods. For example, such systems and methods, when provided in a partial or complete vacuum, provide enhanced isothermic stability of the plasma field due to the elimination (or reduction) of convection. Compare to conventional systems and methods, where heat from the plasma rises (at atmospheric pressure) a turbulent upward breeze is created that can disturb the plasma and alter the thermal balance of the plasma or slightly alter the location of the section of the fiber being heated.

Also such systems and methods, when provided in a partial or complete vacuum, provide enhanced isothermic range of the plasma field due to the elimination (or reduction) of convection. Compare to conventional systems and methods, where as heat from the plasma rises (at atmospheric pressure) it creates a turbulent upward breeze that can disturb the ion trail between the electrodes. This disruption will destabilize and extinguish a plasma in air that is otherwise completely stable in a vacuum or partial vacuum. Since air is an insulator, the dielectric between the electrodes is substantially reduced in a vacuum or partial vacuum. This dielectric reduction allows for an arc to be initiated and maintained at power levels far below what is achievable in air.

Also such systems and methods, when provided in a partial or complete vacuum, provide reduced electrode oxidation. By reducing the oxygen levels present during plasma generation the electrodes will deteriorate at a substantially slower rate.

Also such systems and methods, when provided in a partial or complete vacuum, provide elimination of combustion. Some fiber coatings such as acrylate (the most common fiber coating) are combustible in air at atmospheric pressures and can burn if exposed to a standard arc. When the same process is implemented in a vacuum or partial vacuum the lack of oxygen prevents combustion of the coating allowing it to be thermally ablated (a process similar to "burst technology").

In accordance with one aspect of the present disclosure, provided is a multi-electrode system comprising: a fiber holder that holds at least one optical fiber; a plurality of electrodes arranged to generate a heated field to heat the at least one optical fiber; and a vibration mechanism that causes at least one of the electrodes from the plurality of electrodes to vibrate.

The at least one optical fiber can be at least one large diameter optical fiber having a diameter of at least about 125 microns.

The at least one optical fiber can be a plurality of optical fibers.

The vibration mechanism can broaden a width of the heated field to a full, half max of a Gaussian thermal profile.

In some cases, at least two of the plurality of electrodes can be vibrated.

In other cases, all of the plurality of electrodes can be vibrated.

The system can further comprise a controller that controls the electrode vibration effected by the vibration mechanism.

The vibration mechanism can be or include at least one piezo actuator.

The frequency of vibration of the vibration mechanism can more than 0 Hz but not more than about 10 Hz.

The plurality of electrodes can be two electrodes.

The plurality of electrodes can be three electrodes.

The plurality of electrodes can be four electrodes.

The plurality of electrodes can generate plasma arcs between adjacent electrodes and the heated field can be a heated plasma field.

The heated plasma field can be a substantially uniform heated plasma field.

The substantially uniform heated plasma field can have a temperature of at least about 65° C.

The substantially uniform heated field can generate a fiber surface temperature of at least about 1600° C.

The substantially uniform heated field can generate a fiber surface temperature of at least about 3000° C.

The substantially uniform heated field can generate a fiber surface temperature in the range of about 25° C. to about 900° C. for stripping optical fibers.

The plurality of electrodes can be disposed in at least a partial vacuum.

The electrodes can be disposed in a 22" to 24" Hg gauge vacuum, 200 to 150 torr absolute.

The partial vacuum can be an oxygen-enriched partial vacuum.

The distance between at least two of the plurality of electrodes can be adjustable.

In accordance with another aspect of the present invention, provided is a multi-electrode system that comprises: a fiber holder that holds at least one optical fiber; a plurality of electrodes arranged to generate a substantially uniform heated plasma field to heat the at least one optical fiber; and a vibration mechanism that causes at least one of the electrodes from the plurality of electrodes to vibrate, wherein the vibration mechanism broadens a width of the substantially uniform heated plasma field to a full, half max of a Gaussian thermal profile.

In accordance with another aspect of the present invention, provided is a method of generating a heated field for processing at least one optical fiber. The method includes: holding the at least one optical fiber in a fiber holder; using a plurality of electrodes, generating the heated field to heat the at least one optical fiber; and vibrating at least one of the electrodes from the plurality of electrodes.

The at least one optical fiber can be at least one large diameter optical fiber having a diameter of at least about 125 microns.

The at least one optical fiber can be a plurality of optical fibers.

Vibrating the at least one electrode can broaden a width of the heated field to a full, half max of a Gaussian thermal profile.

The heated field can be a substantially uniform heated plasma field.

The method can include disposing the plurality of electrodes in at least a partial vacuum.

The plurality of electrodes can be two electrodes.

The plurality of electrodes can be three electrodes.

The plurality of electrodes can be four electrodes.

In some cases, the method can include vibrating at least two of the plurality of electrodes.

In other cases, the method can include vibrating all of the plurality of electrodes.

BRIEF DESCRIPTION OF THE DRAWINGS

The drawing figures depict preferred embodiments by way of example, not by way of limitation. In the figures, like reference numerals refer to the same or similar elements.

DETAILED DESCRIPTION OF PREFERRED EMBODIMENT

It will be understood that, although the terms first, second, etc. can be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In accordance with aspects of the present invention, provided is a system having a multi-electrode arrangement configured for delivering a substantially even distribution of heat about an optical fiber. As will be appreciated by those skilled in the art, the techniques described herein are applicable to providing arcs used for splicing and/or stripping optical fibers. Such multi-electrode systems can also be useful in other contexts and applications, such as annealing, diffusion, tapering, and ablation. Such systems and methods can also be useful in other applications and contexts, such as for making optical fiber couplings. Generally, any of the foregoing, or combination thereof, can be referred to as a multi-electrode system, a fiber preparation system, or a multi-electrode fiber preparation system.

Figure 1A:
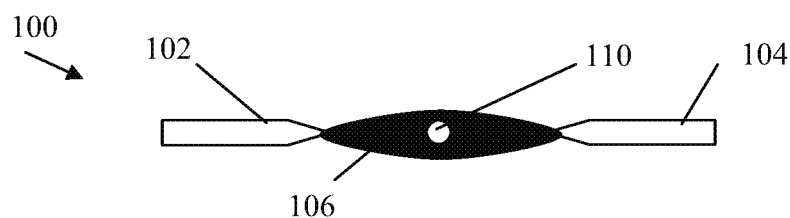
FIG. 1A and FIG. 1B are diagrams of a prior art dual electrode arrangement used for splicing an optical fiber, shown with a small diameter fiber in FIG. 1A and a large diameter fiber in FIG. 1B.
Figure 1B:
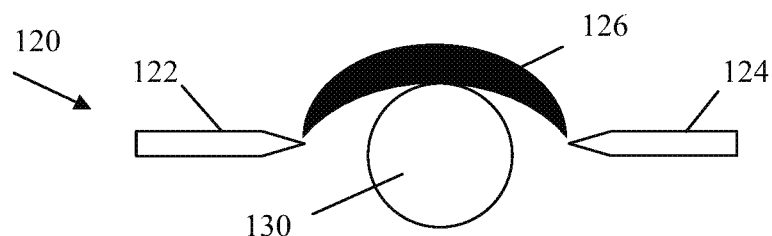
Figure 2A:
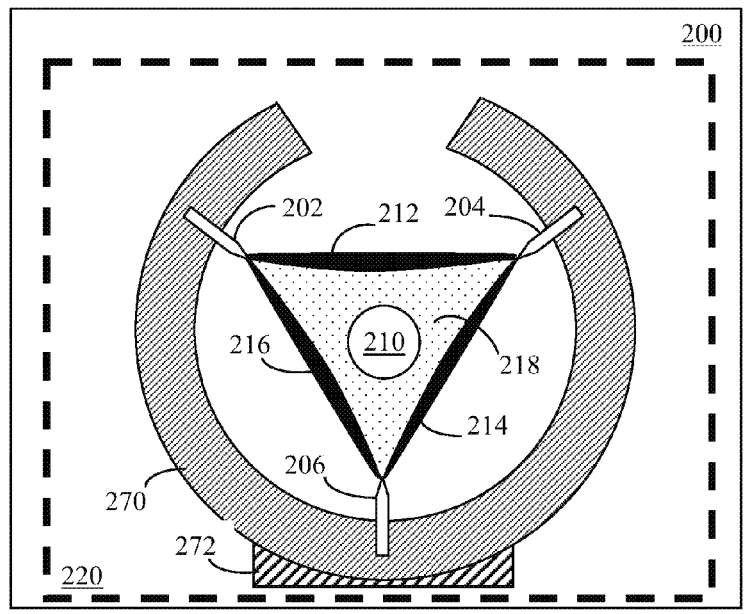
FIG. 2A is a diagram showing an embodiment of a multi-electrode arrangement in accordance with aspects of the present invention.

In the illustrative embodiment of FIG. 2A a multi-electrode system 200 comprises three electrodes 202, 204, and 206, which can be disposed around at least one fiber 210. Here the electrodes are shown in a "Y" configuration, with a cross-sectional view of the fiber 210 shown. That is, fiber 210 would be extending out of the page, substantially perpendicular to the multi-electrode arrangement. While not shown, the at least one fiber 210 is held by a fiber holder (or support) such that it can be disposed between the electrodes 202, 204, and 206. If the at least partial vacuum is used, distal portions of the fiber(s) can exit the vacuum enclosure through appropriate known sealing devices, if desired. Such fiber holders are known in the art.

In some embodiments, electrodes 202, 204, and 206 can also be disposed in at least a partial vacuum, as is shown by dashed line 220. In a partial vacuum of 22" to 24" Hg gauge vacuum (e.g., 200 to 150 torr absolute), plasma temperatures as cool as 65° C. have been achieved. Room temperature plasmas are also possible at higher vacuum levels. For some fiber coatings, this process can be enhanced (e.g., better and faster results) by stripping the fiber in an oxygen enriched partial vacuum with cool plasma (less than 400° C.). This approach etches the coating off of the fiber, as opposed to a pyrolysis removal which can weaken the fiber and leave charring (i.e., carbon) at the interface of the strip window.

Regardless of whether or not the electrodes 202, 204, and 206 are disposed in at least a partial vacuum, by placing three pointed electrodes so their outputs form the vertices of an equilateral triangle around the splice region within which at least one fiber can be located, it is possible to provide very evenly distributed heating around the circumference of the fiber 210. By driving the three electrodes 202, 204, and 206 with high-frequency (e.g., 30 kHz) AC voltages in a "three-phase" configuration, three separate arcs can be generated, referred to as arc 212, arc, 214, and arc 216 in FIG. 2A.

In the embodiment of FIG. 2A, the fiber 210 is completely surrounded by the plasma arcs 212, 214, and 216, providing a heated plasma field 218 having a very even heat distribution. It should be understood that a system and/or method in accordance with aspects of the present invention is capable of producing fiber surface temperatures like those produced by systems and methods using less than three electrodes, but does so with improved uniformity. For example, a system according to aspects of the present invention can produce a plasma field sufficient to generate a fiber surface temperature in the range of about 25°-900° C. for stripping and up to about 1,600° C. or more for splicing. For example, temperatures in excess of 3,000° C. have been achieved. However, if dictated by the physics of the fibers, fiber coatings, environmental conditions, and/or other relevant parameters, the plasma field could be generated to achieve other fiber surface temperatures.

The electrodes 202, 204, and 206 can be relatively close to the fiber 210, which will expose the fiber directly to the plasma field 218. Alternatively, the electrodes 202, 204, and 206 can be further away, which would heat the fiber from the radiant heat of the plasma—this can be more suitable for stripping/cleaning operations. In various embodiments, the multi-electrode system can have a plurality of settings, e.g., 1 each for splicing and/or stripping a large fiber and a small/standard fiber. In various embodiments, the multi-electrode system 200 can be configured for adjusting the distance between the electrodes 202, 204, and 206 within a range of positions. In various embodiments, the multi-electrode apparatus can be configured to detect the fiber size and self-position the electrodes 202, 204, and 206 as a function of the fiber size and the desired operation, e.g. splicing, annealing, diffusion, stripping, tapering, ablation, or making couplings. See, for example, FIG. 2B.

For stripping some fiber coatings, direct exposure to the arc plasma is beneficial, as an example. Ionized oxygen atoms within the plasma field oxidize and ablate the coating away. The electrode spacing can be configured to directly expose the coating surface to the plasma. Otherwise, the methods of using this effect are equivalent to those for stripping by thermal decomposition.

The electrodes 202, 204, and 206 can be placed in a "one down, two up" configuration as shown, or inverted, depending on the requirements of other items near the fiber (such as the lenses of an optical system in a splicer). Alternatively, the electrodes 202, 204, and 206 can be placed in a horizontal plane, or irregularly spaced or angled according to various applications.

In this embodiment, the electrodes 202, 204, 206 are supported by (or attached to) an annulus 270, which can also be referred to as an electrode support. Annulus 270 is coupled or attached to, or supported by, a vibration mechanism 272. This arrangement is such, that vibration mechanism 272 causes vibration of annulus 270, which in turn causes a corresponding vibration of electrodes 202, 204, 206. In this embodiment, annulus 270 defines an opening that enables easy fiber 210 loading between the electrodes 202, 204, 206.

Vibrating electrodes 202, 204, 206 can have certain benefits, in particular, broadening the width of the plasma field. Experimentation to date has shown that a Gaussian thermal profile along the axis of fiber 210 is created when the electrodes are vibrated. Various aspects of the vibration are discussed in more detail with respect to FIGS. 6A-C.

The various techniques known for improving and controlling arc performance with conventional two-electrode systems can also be applied or adapted to embodiments, including pulse width modulation, ion injection, feedback control, etc. The electrodes can also be fitted with shields or focusing sleeves or other technologies intended to alter arc distribution. Known arc bending techniques utilizing dielectrics inserted near the plasma field can also be used.

The principles of the present invention could also be extended to a system of four or more electrodes.

Figure 2B:
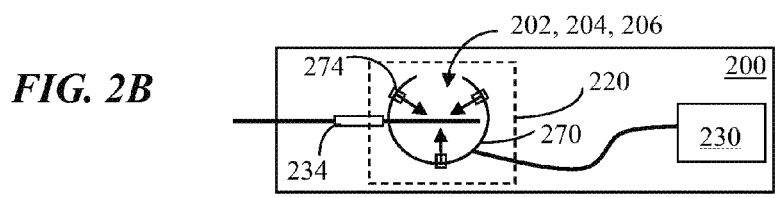
FIG. 2B is a block diagram showing an electrode support and fiber support that can be used with the embodiment of FIG. 2A.

FIG. 2B shows an embodiment of an electrode support and fiber support that can be used with the system described above in FIG. 2A. Annulus 270, as an electrode support, can be used to maintain the electrodes 202, 204, 206 in their desired orientations about an axis on which the at least one fiber 210 can be disposed for splicing, annealing, diffusion, stripping, tapering, ablation, or for making optical fiber couplings. Vibration mechanism 272 (shown in FIG. 2A) can also be used to selectively vibrate the annulus 270, or the electrode actuators 274 could be used to vibrate one or more of electrodes 202, 204, 206. The at least one optical fiber 210 is held and maintained in position by a fiber support 234. Annulus 270 can include electrode actuators 274 configured to adjust the distances of the electrodes 202, 204, and 206 relative to the at least one optical fiber 210. Electrode actuators 274 can also be configured to automatically adjust the distances of the electrodes to the at least one optical fiber 210 as a function of a diameter of the at least one optical fiber, using, for example, piezoelectric actuators connected to a controller 230. Controller 230 could include a microprocessor and memory that stores predefined settings for electrode configuration and/or distance from fiber as a function of the size of the fiber and/or the processing to be done, e.g., splicing, annealing, diffusion, stripping, tapering, ablation, or making optical fiber couplings.

Figure 2C:
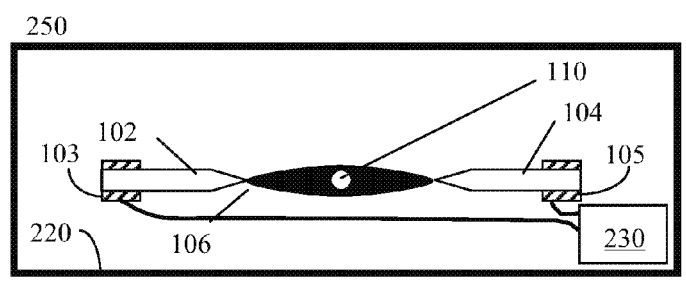
FIG. 2C is an embodiment showing a two electrode arrangement with vibrating electrodes.

FIG. 2C is an embodiment showing a two electrode arrangement in at least a partial vacuum, such as that described herein. That is, such electrode arrangements can also benefit from operation in such a vacuum, in accordance with aspects of the present invention. In at least a partial vacuum, two electrodes can also achieve a plasma field having a substantially even heat distribution. Additionally, one or more of the electrodes 102, 104 can be coupled to a vibration mechanisms 103, 105, e.g., to create a broader plasma field. Vibration mechanisms 103 and 105 can be the mechanism, two vibration mechanisms under common control by controller 230, or two vibration mechanisms independently controlled.

Figure 3:
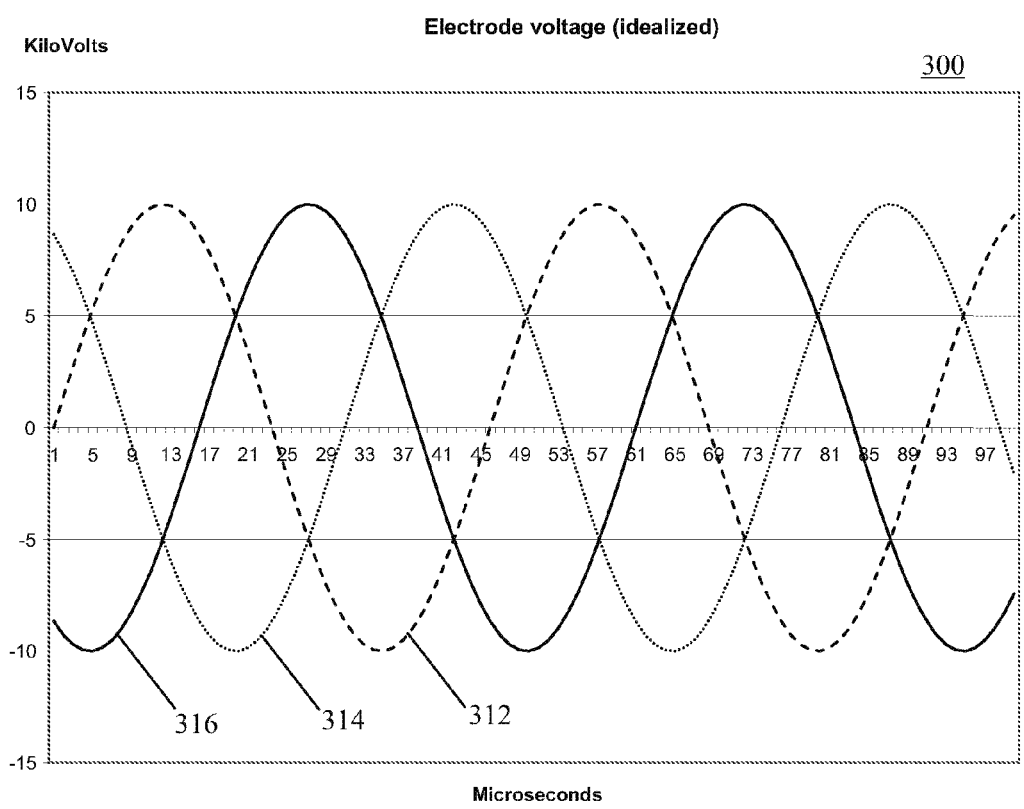
FIG. 3 is a graph showing the relative sinusoidal phase of the three electrodes of the embodiments of FIGS. 2A and 2B.

FIG. 3 is a graph 300 that shows an example of voltages which could be provided at the electrodes 202, 204 and 206 to create a three-phase arc, as shown in FIG. 2A. The example shown has an overall frequency of approximately 22 kHz with a peak-to-peak voltage of 20 kV. Plot 312 is for electrode 202, plot 314 is for electrode 204, and plot 316 is for electrode 206.

In the example, there is an arc present between electrodes 204 and 206 at time 0 μs, see plots 314 and 316. At approximately 6 μs, the arc shifts to the space between electrodes 202 and 206, see plots 312 and 316. At 13 μs, the arc moves to electrodes 312 and 314, see plots 312 and 314, and so forth. At any given time, an arc should be present between two electrodes with the greatest potential difference between them. The rotating phase sequence takes place so rapidly that the arc appears to be constantly on, and substantially constant heating is provided, as the thermal time constants of the fiber and surrounding air are substantially longer than the oscillation period of the arc.

Figure 4:
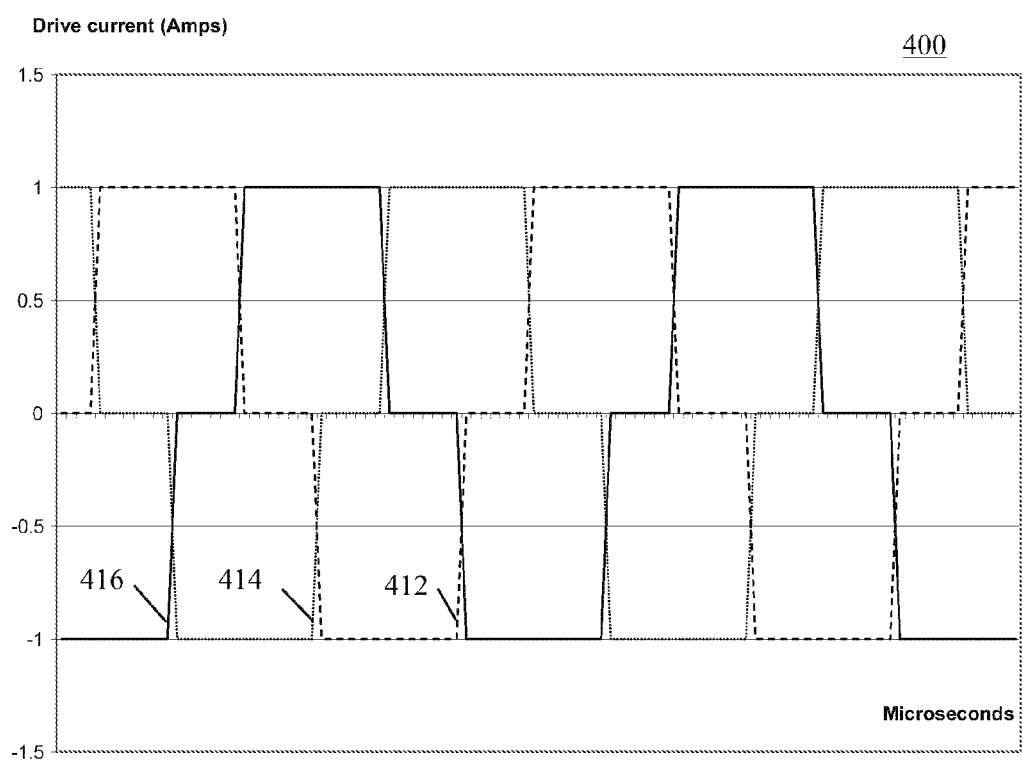
FIG. 4 is a graph showing a preferred waveform for the current applied to a set of transformer primaries to achieve the results in FIG. 3.

As noted in the background information, it is extremely difficult to actually control the voltage at the electrodes. However, the far more practical method of controlling current to the primary of the step-up transformer can be applied in the illustrative embodiment. FIG. 4 shows graph 400 having a preferred waveform for the current applied to the transformer primaries. This system of drive currents will produce output voltage waveforms roughly corresponding to those shown in FIG. 3, producing a controllable three-phase arc.

The primary drive currents for the transformers require three waveforms disposed at 0 degrees phase, 120 degrees phase, and 240 degrees phase. These can be generated by well-known digital or analog means, such as a ring counter. In graph 400, plot 412 is for electrode 202, plot 414 is for electrode 204, and plot 416 is for electrode 206.

Figure 5:
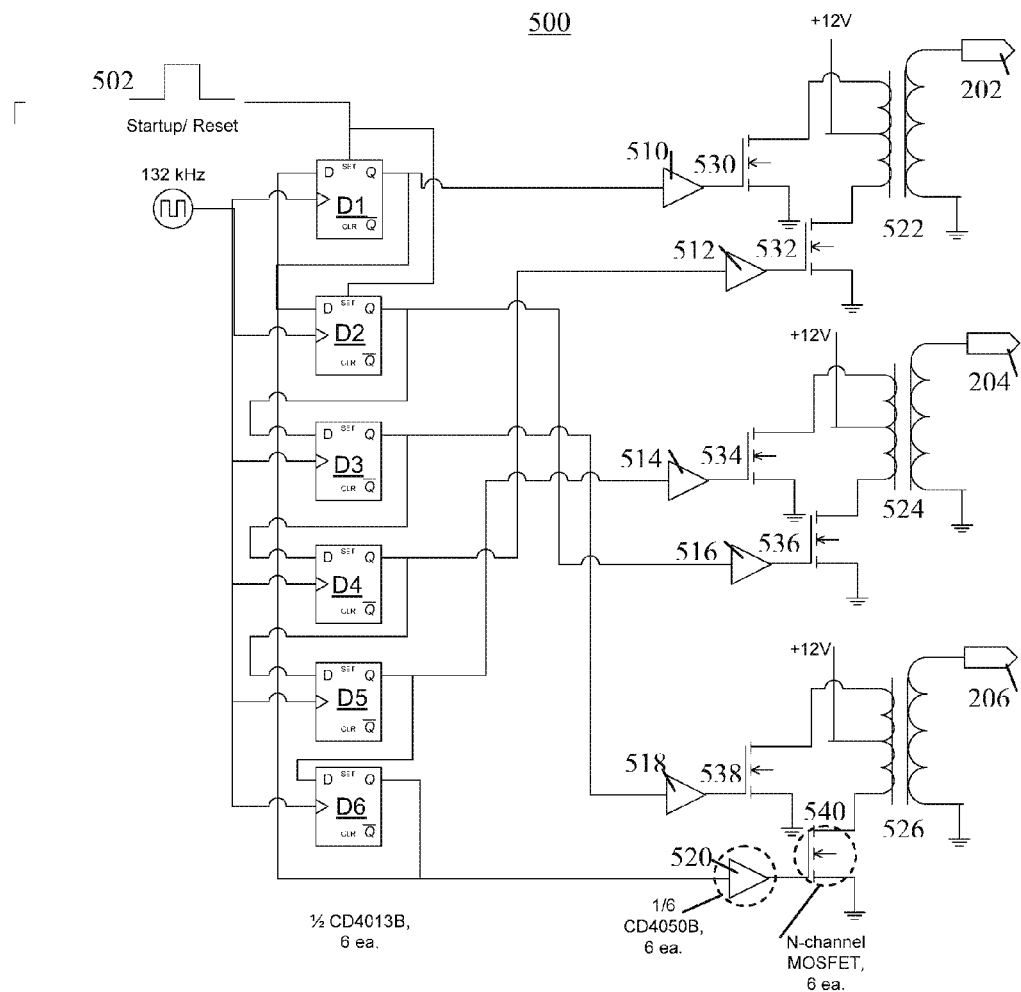
FIG. 5 is a schematic diagram of an embodiment of a circuit for driving the three electrode arrangement of FIGS. 2A and 2B.

FIG. 5 is schematic diagram of an embodiment of a circuit 500 configured to drive the three electrode 202, 204, and 206 arrangement of FIG. 2A. Six D-type flip-flops D1-D6 are configured to implement a circular shift register. A short startup pulse 502 is applied to initialize the circuit 500. Initially, electrode 202 is positive and electrode 204 is negative, but then each sequences through the various phase states. As an example, the overall frequency can be ⅙ of the clock frequency of 132 KHz in this embodiment. In other embodiments, this can differ, preferably maintaining a substantially uniformly or evenly heated plasma field. Current control circuitry (not shown) can be substituted for the CD4050 buffers 510, 512, 514, 516, 518, and 520.

The required voltages could be generated from three separate 10CT:780 high voltage transformers 522, 524, and 526, or from a tuned LC configuration wound on a single core. It is also possible for the three transformer 522, 524, and 526 secondaries to be connected in a "delta" configuration, wherein the secondary coils are connected between adjacent pairs of electrodes, rather than being referenced to ground as in FIG. 5.

In FIG. 5, MOSFETS 530, 532, 534, 536, 538, and 540 drive transformers 522, 524, and 526. In accordance with various aspects of the invention, the multi-electrode system can include a dead-band feature to increases efficiency and reduce dissipation in the drive transistors/MOSFETs 530, 532, 534, 536, 538, and 540, by preventing overlap in conduction between the "positive-driving" and "negative-driving" devices. The dead-band feature can also provide a mechanism for adjusting arc power (e.g., by varying the width of the dead-band). The dead-band feature can also enable cleaner transitions between states of the arcs, by allowing an existing arc to extinguish momentarily before establishing the next arc in the phase sequence.

The dead-band feature can be implemented by producing the controlled current waveforms to include two dead-bands of 1% to 49% of the period of the cycle, wherein there is substantially no current flow through the transformer primary.

Another embodiment of a three electrode system can generate an arc of substantially the same properties as that of the three electrode system described above with respect to FIG. 2A, but with one grounded electrode and only two powered electrodes.

Figure 6A:
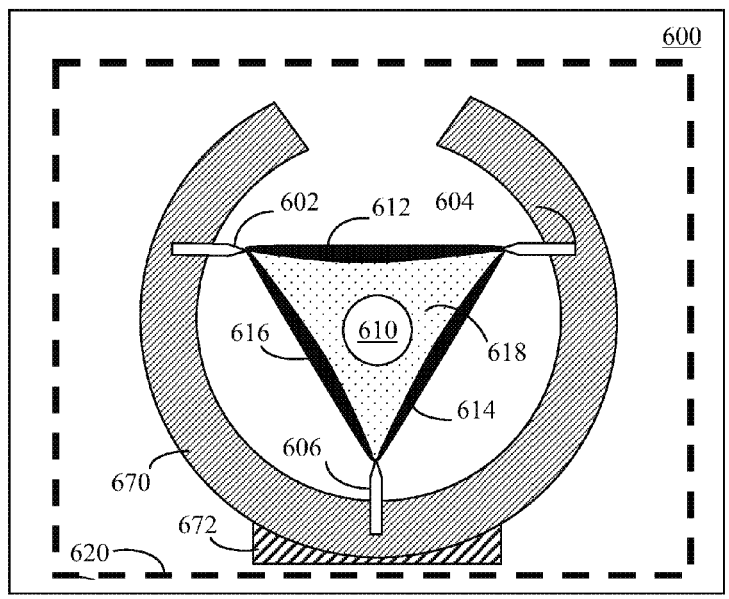
FIG. 6A is a diagram showing another embodiment of a multi-electrode arrangement in accordance with aspects of the present invention.

FIG. 6A shows an illustrative embodiment of a multi-electrode system 600 having one electrode grounded and two electrodes powered, which can also be disposed in at least a partial vacuum 620. In such a case, corresponding benefits are possible with the embodiment of FIG. 6A as those described above with respect to the embodiment of FIG. 2A. Here, electrodes 602, 604, 606 are used to generate arcs 612, 614, 616, which in turn creates plasma field 618 around at least one fiber 610 disposed between the electrodes.

In a three-phase arc system 200 as described in with respect to FIG. 2A, electrodes 204, 204, and 206 are each driven by a voltage waveform, where the three voltage waveforms were 120° apart in phase. This produces arcs 212, 214, and 216. In this embodiment, electrodes 602 and 604 are oriented on a common axis, to form a "T" configuration with electrode 606. The performance is substantially the same as if the electrodes where oriented at 120° apart from each other, as in the embodiment of FIG. 2A. For this embodiment, however, the configuration is more compact, e.g., more suitable to be integrated into a fusion splicer, without compromising performance. Those skilled on the art, now having the benefit of this disclosure, will appreciate that other electrode orientations could be used.

In the present embodiment of FIG. 6A, electrode 606 is grounded. If electrode 602 and electrode 604 are each driven by an identical waveform, at 0° relative phase, arc 612 would not be formed, as there would be no potential difference between electrodes 602 and 604. Two equal arcs will be formed, that is arcs 614 and 616, forming a "V" shape.

If electrode 606 remains grounded, and electrodes 602 and 604 are driven by voltage waveforms of opposite polarity (i.e., 180° relative phase), only arc 612 will form. This is because the potential difference between electrodes 602 and 604 is twice as great as the potential between either one of electrodes 602 and 604 and the grounded electrode 606.

Considering the above cases, it seems logical that at some particular degree of phase separation (between 0° and 180°) between the voltage waveforms applied to electrodes 602 and 604, with electrode 606 grounded, that all three arcs 612, 614, 616 would be formed at substantially equal intensity. A theoretical analysis (based on vector mathematics) suggests that this would occur at 60° relative phase. In implementation, it has been found necessary to vary the phase between approximately 40° and 160°, depending on various implementation factors, such as the frequency and power of the drive waveforms and the spacing and condition of the electrodes. In forming arcs 612, 614, and 616 at substantially equal intensity, a substantially uniform heated plasma field 618 is generated around the at least one optical fiber 610.

In this embodiment, electrodes 602, 604, 606 are supported, coupled, or mounted to an annulus 670, like annulus 270 of FIG. 2A. Annulus 670 is coupled or attached to, or supported by, a vibration mechanism 672, like vibration mechanism 272. The annulus can be made of any of a variety of materials that maintain structural integrity within anticipated heat ranges, such as ceramics.

Figure 6B:
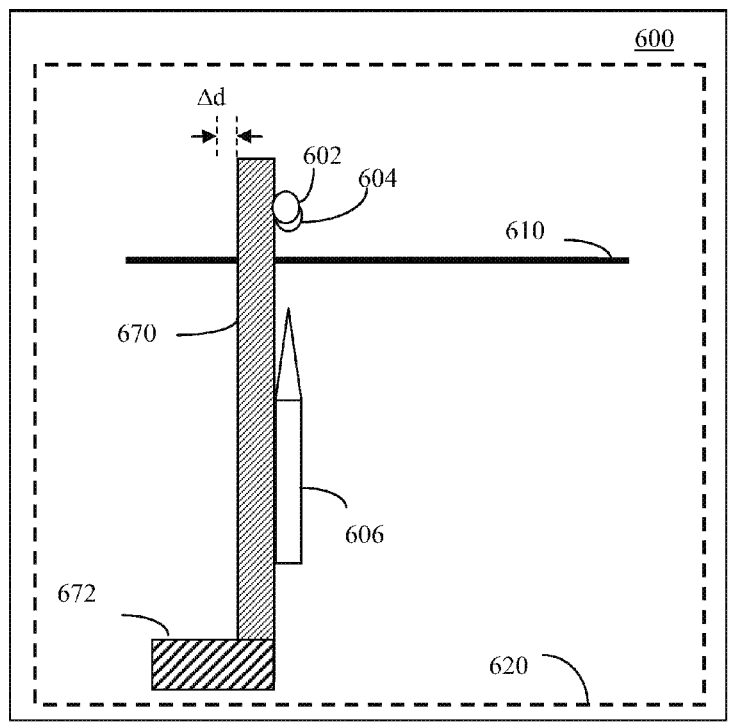
FIG. 6B is a diagram showing a side view of the embodiment of FIG. 6A.

FIG. 6B is a diagram showing a side view of the multi-electrode system 600 of FIG. 6A. In this embodiment, annulus 670 is support on vibration mechanism 672. Vibration mechanism 672 is arranged to cause annulus 670 to vibrate back and forth within a range or distance Δd. Electrodes 602, 604, 606 experience a corresponding vibration, which broadens the plasma field 618 caused by arcs 612, 614, 616. As a result, the width of the plasma field 618 can be modulated.

The vibration mechanism can be any of a variety of types of vibration mechanism, such as, for example, a piezo actuator that experiences oscillation in the form of expansion and contraction in response to an applied AC voltage, In the present embodiment, the piezo actuator can be made of a crystal, ceramic, or other piezo material, or combinations thereof. The piezo can be built into a flexure stage to provide precision linear motion.

Figure 6C:
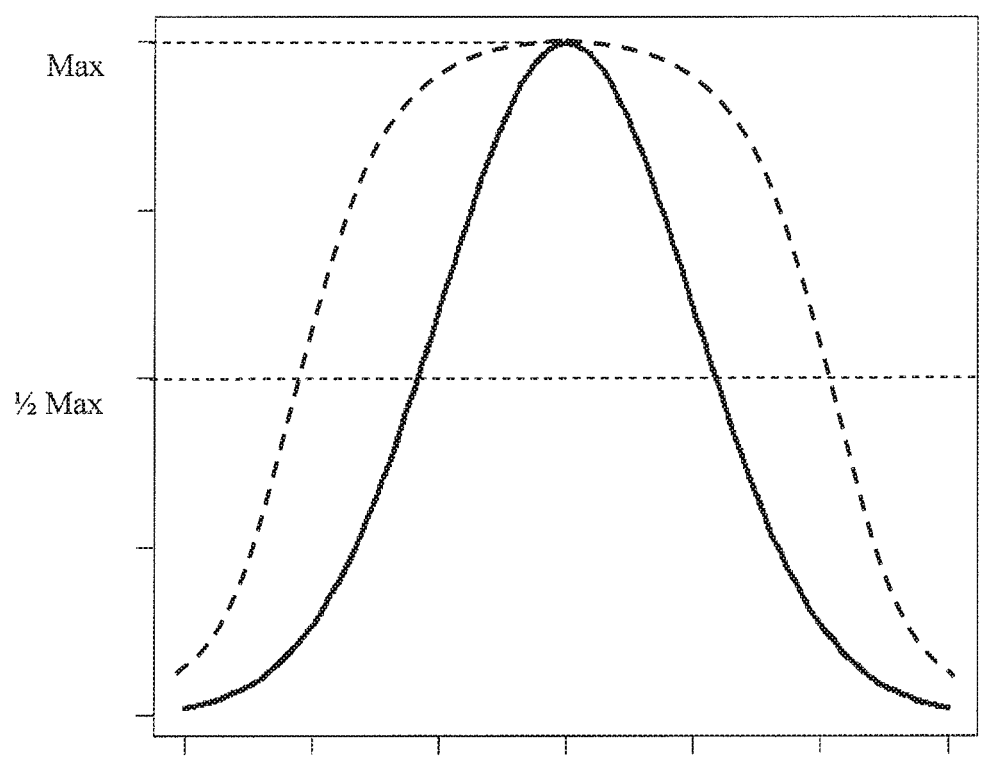
FIG. 6C is a plot showing a Gaussian thermal profile of the plasma field produced by vibrating the electrodes in FIGS. 6A-B and 2A-B.

FIG. 6C shows two thermal profiles of a plasma field as Gaussian curves, for illustrative purposes. Here, the Y-axis represents Temperature and the X-axis represents Distance from the electrodes with the center of the curve indicating a distance of 0. The first, narrow, thermal profile of the plasma field is indicated by the solid line, and is produced when electrodes are not vibrated. The second, wider, theinial profile of the plasma field is indicated by the dashed line, and is produced when electrodes are vibrated. For example, referring to the embodiment of FIG. 6A the thermal profile of the plasma field 618 along the axis of fiber 610 is significantly broader than it would be if none of the electrodes 602, 604, 606 were not vibrated. Vibrating electrodes results in the broader thermal profile of the plasma field; power is also preferably added to maintain the plasma field at the Max value of the non-vibrated electrode embodiments. The present invention is not limited to the profiles shown in FIG. 6C, since these can be altered by adjustments in power, vibration frequency, and vibration range.

Figure 7:
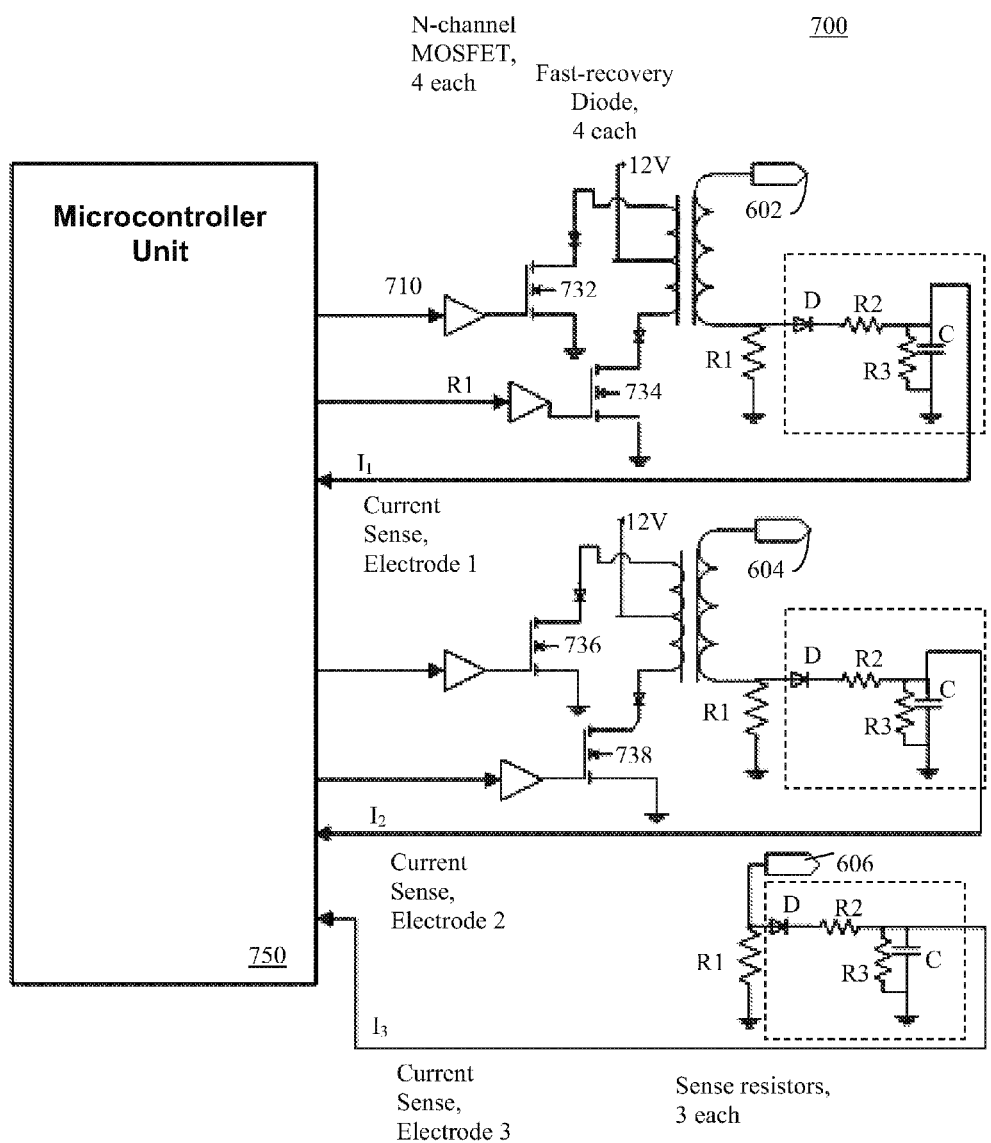
FIG. 7 is a schematic diagram of an embodiment of a circuit for driving three electrode arrangement of FIG. 6.

FIG. 7 is a schematic diagram of an embodiment of a circuit 700 for driving the three electrode 600 arrangement of FIG. 6. The embodiment in FIG. 7 is similar to that of FIG. 5 in terms of buffers, MOSFETs and transformers, but unlike FIG. 5, in FIG. 7 the third electrode is tied to ground and does not include the buffer, MOSFET, and transformer circuitry.

In the embodiment of FIG. 7, the signals which turn the drive MOSFETs 732, 734, 736, and 738 on and off can be generated by a programmable microcontroller unit 750, and provided via buffers 710, 712, 714, and 716. As examples, the MOSFET drivers 732, 734, 736, and 738 can be MC34151 (or similar) MOSFETs and the microcontroller 750 can be a PAL18F2520 manufactured by Microchip, Inc. This circuit of this embodiment allows real-time control and adjustment of the duration and phase relationship of the drive signals. The real-time adjustments can be made with the goal of maintaining arcs 612, 614, and 616 substantially equal in intensity or to deliberately alter their relative intensity for various purposes.

In order for the microcontroller 750 to be able to sense the arc intensities, small-value resistors R1 (for example, 100 Ohm resistors) can be connected in series with the ground return of each drive signal. A voltage develops across the resistor R1 in direct proportion to the arc current delivered by the electrode 602. A sense resistor R1 is provided for each electrode. For example, a 20 mA current from electrode 602 would result in a 2V signal across the 100 Ohm sense resistor R1.

The sense resistor signals are in the form of high-frequency AC voltages. It is possible to rectify and filter these signals to produce DC voltages, which are more suitable for measurement by the microcontroller unit 750.

The simple rectification/filtering networks shown include a diode D, two resistors R2 and R3, and a capacitor C, and are provided for each of the three electrodes. This network produces a voltage proportional to the arithmetic mean (i.e., average) of the absolute value of the sense resistor voltage. If greater accuracy is required, well-known means can be used to produce a voltage proportional to the quadratic mean (e.g., root-mean-square or RMS) of the sense resistor voltage. The RMS value is a better measurement of the power delivered into the arc, which may be important in some applications.

An additional improvement to the embodiment can be to make the power supply adjustable, which is shown as "12V" in FIG. 7. An adjustable "buck regulator" circuit, well-known in the art, can adjust the voltage downward from 12V to a very low voltage (e.g. 1V) or any desired intermediate voltage. This can be useful when an arc of very low power is required, as it has been found that very low pulse widths to the MOSFET's (the previous method of obtaining low power operation) can result in unstable arc operation. Alternatively, a lower input voltage and/or lower transformer step-up ratio can be used in conjunction with a boost-type regulator to provide an equivalent range of voltages.

Figure 8:
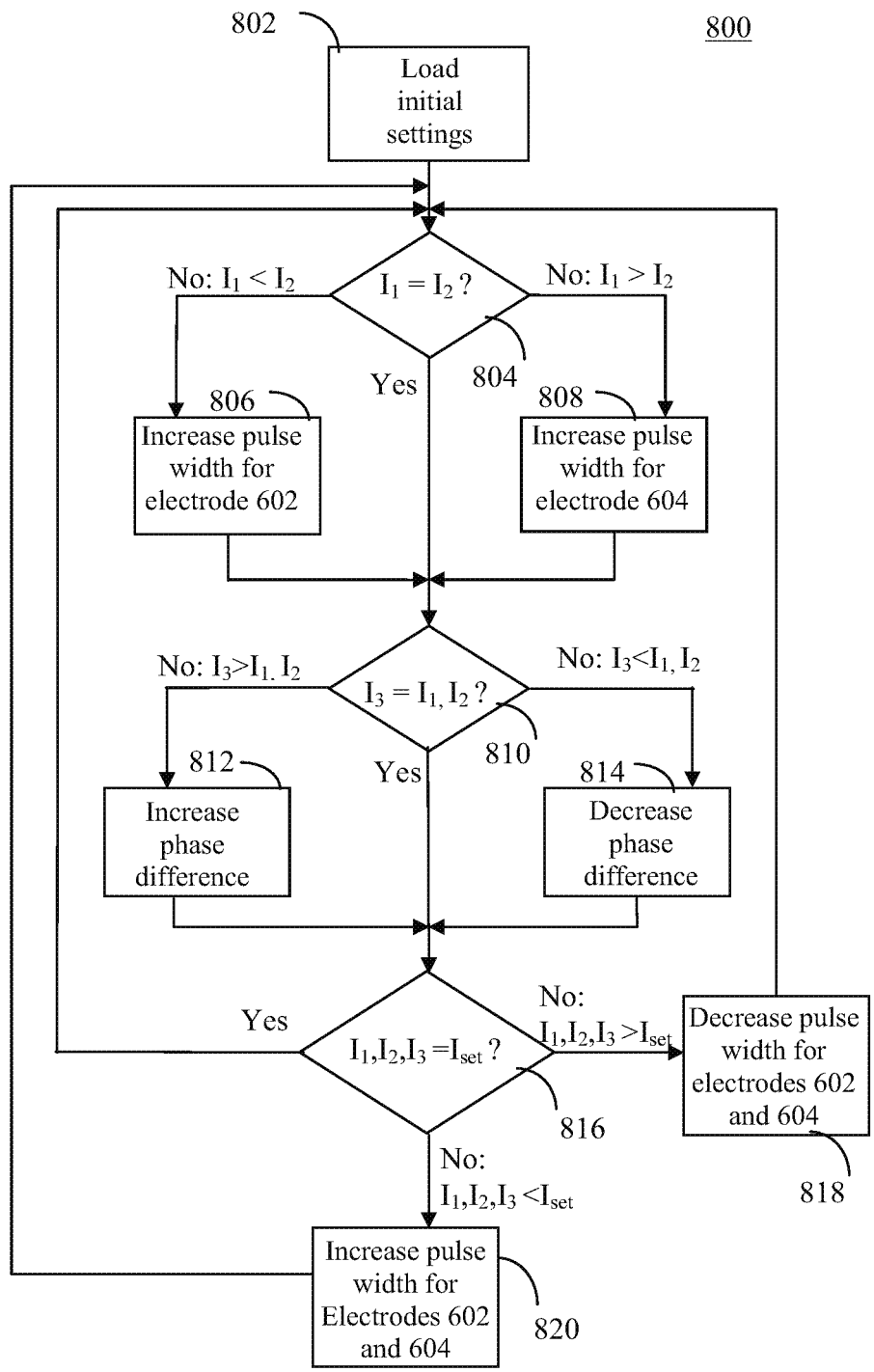
FIG. 8 is a flowchart depicting an embodiment of a real-time control algorithm 800 that can be implemented by the microcontroller unit of FIG. 7.

FIG. 8 is a flowchart depicting an embodiment of a real-time control algorithm 800 that can be implemented by the microcontroller unit 750 of FIG. 7. The control algorithm 800 performs an evaluation of sensed currents for each of electrodes 602, 604, and 606, represented as currents $I_1$, $I_2$, and $I_3$ in FIGS. 7 and 8. In this method the pulse width of electrodes 602, 604, and 606 is adjusted based on whether the sensed currents $I_1$, $I_2$, and $I_3$ are substantially equal to a current $I_{set}$ representing an initial current setting by microcontroller unit.

Specifically, in step 802 initial circuit settings are entered for electrodes 602, 604, and 606, including initial current $I_{set}$. In step 804 a determination is made of whether $I_1=I_2$. If the answer is "yes," then the method continues to step 810. If in step 804, $I_1<I_2$ then the process continues to step 806 where the pulse width for electrode 602 is increased. If in step 804, $I_1>I_2$ then the process continues to step 808 where the pulse width for electrode 604 is increased. As with step 804, after steps 806, 808 the process continues 810.

In step 810, a determination is made of whether $I_3=I_1$, $I_2$. If the answer is "yes," the process continues to step 816. If in step 810, $I_3>I_1$, $I_2$ then the process continues to step 812 where the phase difference is increased. If in step 810, $I_3<I_1$, $I_2$ then the process continues to step 812 where the phase difference is decreased. As with step 810, after steps 812, 814 the process continues to step 816, where a determination is made of whether $I_1$, $I_2$, $I_3=I_{set}$. If the answer is "yes," then the process continues to step 804 and is repeated. If in step 816 $I_1$, $I_2$, $I_3>I_{set}$ then in step 818 the pulse width for electrodes 602 and 604 is decreased. If in step 816 $I_1$, $I_2$, $I_3<I_{set}$ then in step 820 the pulse width for electrodes 602 and 604 is increased. In each case, the process then continues to step 804 and is repeated.

It will be apparent that there are other possible arrangements of the electrodes that are within the spirit and scope of the invention. These alternative arrangements may be preferable in circumstances where it is desired to change the pattern of heating of the fiber, or where an alternative arrangement facilitates the positioning of the electrodes with respect to other equipment in a larger system.

Figure 9A:
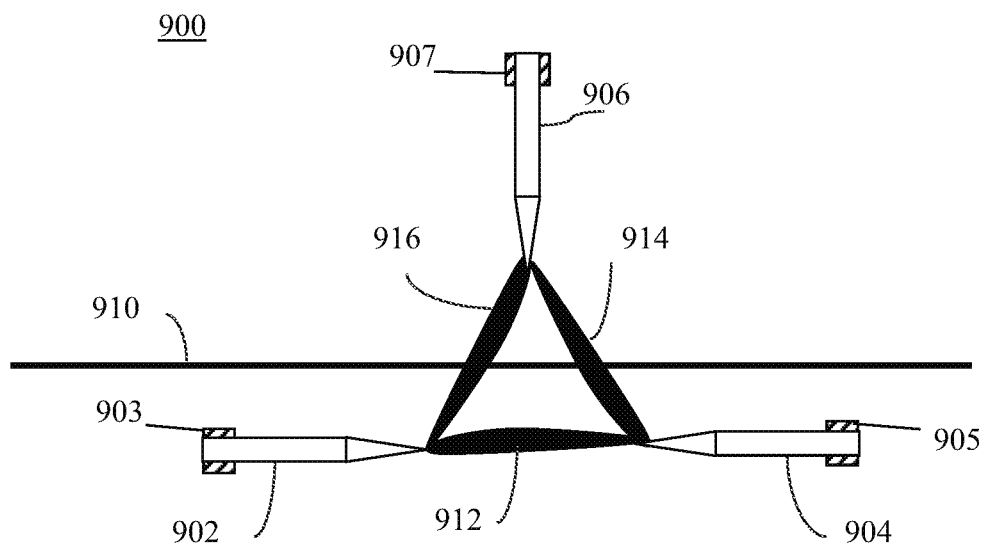
FIGS. 9A and 9B are diagrams showing another embodiment of a three electrode arrangement in accordance with aspects of the present invention.
Figure 9B:
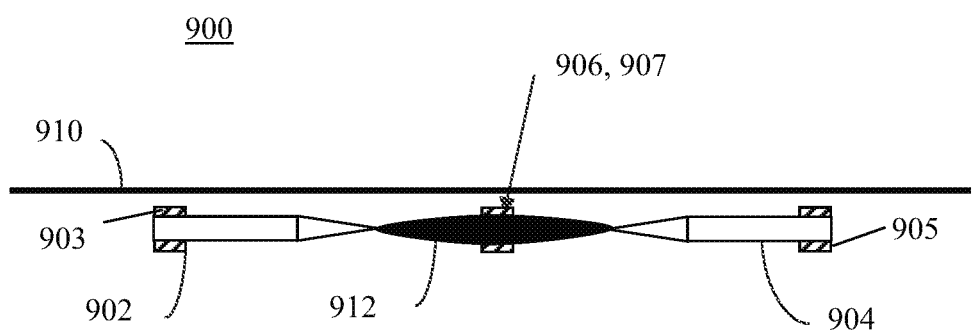

FIGS. 9A (bottom view) and 9B (side view) are diagrams showing another embodiment of an electrode arrangement in accordance with aspects of the present invention. In these figures a three electrode fiber system 900 is shown that includes electrodes 902, 904, and 906 placed in a horizontal plane, so that the arcs 912, 914, and 916 are produced in this same plane. The fiber 910 is disposed above this plane, so that it is heated substantially by an upward convective flow of heat from the arc region. The range of the distance between the planes in this embodiment would be 1 mm-10 mm. The electrodes may be disposed in a "Y" configuration, "T" configuration, or such other configuration as the application requires or as may be convenient. For example, four electrodes could be placed to form a rectangular arc array, or five might be arranged in a pentagon shape. One or more of the electrodes 902, 904, 906 may be coupled to a vibration mechanism 903, 905, 907—as discussed above.

Figure 10A:
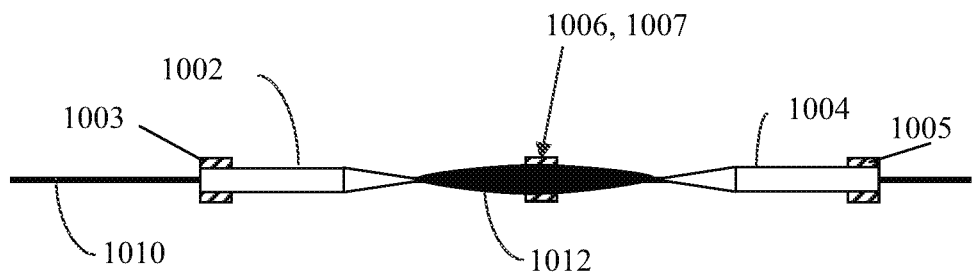
FIGS. 10A and 10B are diagrams showing another embodiment of a three electrode arrangement in accordance with aspects of the present invention.
Figure 10B:
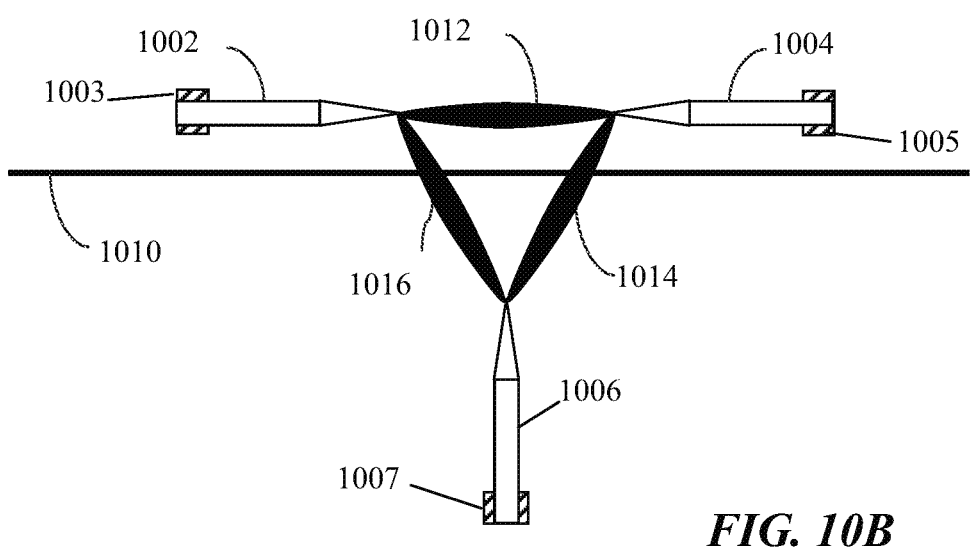

FIGS. 10A (bottom view) and 10B (side view) are diagrams showing yet another embodiment of a three electrode arrangement in accordance with aspects of the present invention. In these figures a three electrode fiber system 1000 is shown that includes electrodes 1002, 1004, and 1006, which produce arcs 1012, 1014, and 1016. A fiber 1010 may be disposed in the same plane (for example, a vertical plane) as the electrodes 1002, 1004, and 1006. In this arrangement, the fiber 1010 intersects at least two of the arcs 1012, 1014, and 1016. In this way, the fiber will be heated along a greater portion of its length, although the circumferential heat distribution is not as even as in other embodiments. One or more of the electrodes 902, 904, 906 may be coupled to a vibration mechanism 903, 905, 907—as discussed above.

FIGS. 11A-H show various embodiments of a multi-electrode system 1110 that uses four electrode arrangements in accordance with aspects of the present invention. In each embodiment, electrodes 1102, 1104, 1106, and 1108 are shown, and create arcs 1112, 1114, 1116, and 1118. The arcs create a plasma field 1119, which heats at least one fiber 1110. The electrodes may be disposed in at least a partial vacuum 1120, as discussed above, but embodiments without the at least partial vacuum 1120 also may be used. One or more of electrodes 1102, 1104, 1106, and 1108 can optionally be mounted to a vibration mechanism 1172, as discussed above. Other embodiments can forego one or both of the vibration mechanism and at least partial vacuum.

Figure 11A:
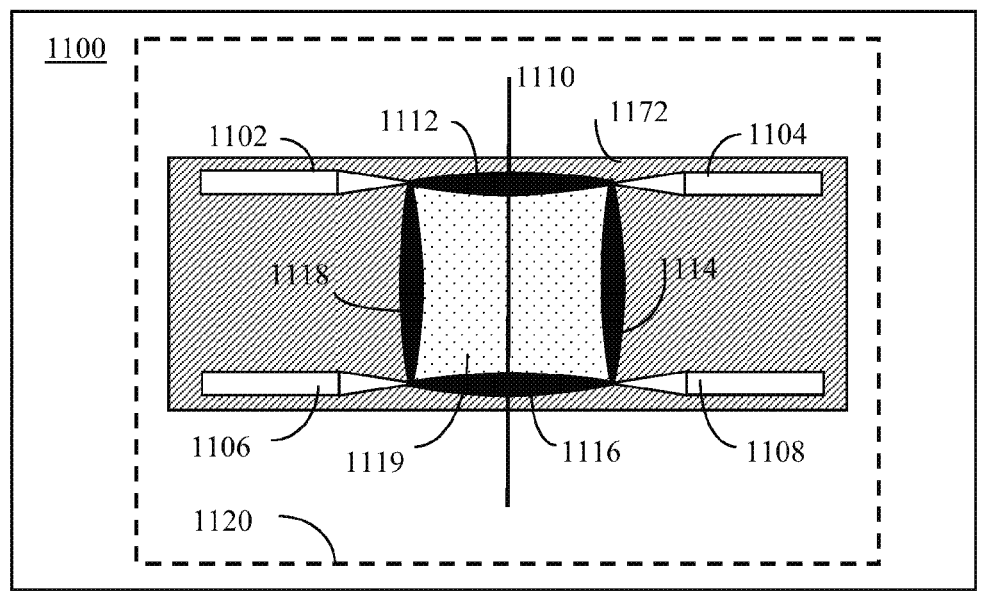
FIGS. 11A-H show various embodiments of four electrode arrangements in accordance with aspects of the present invention.
Figure 11B:
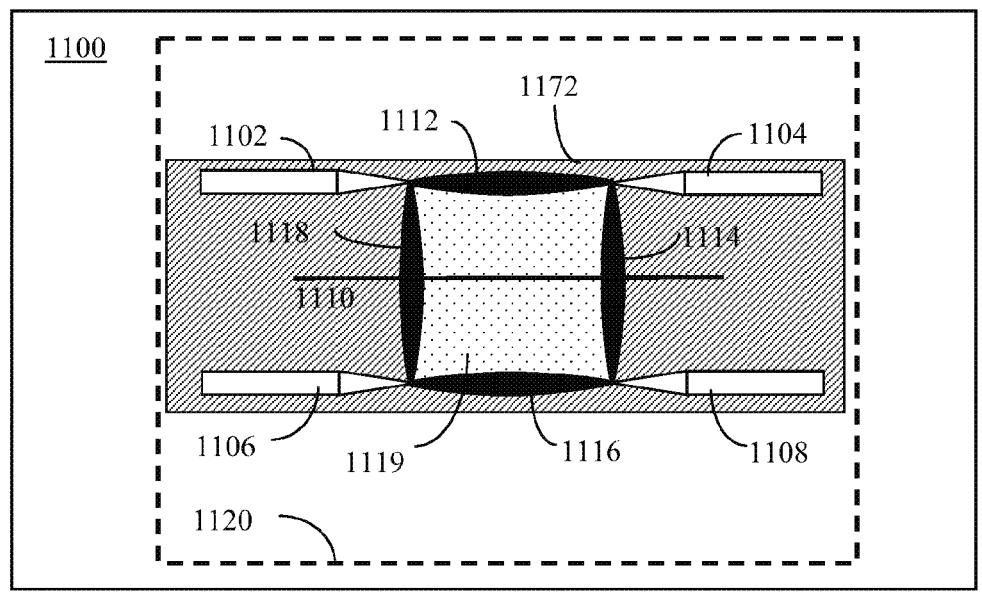
Figure 11C:
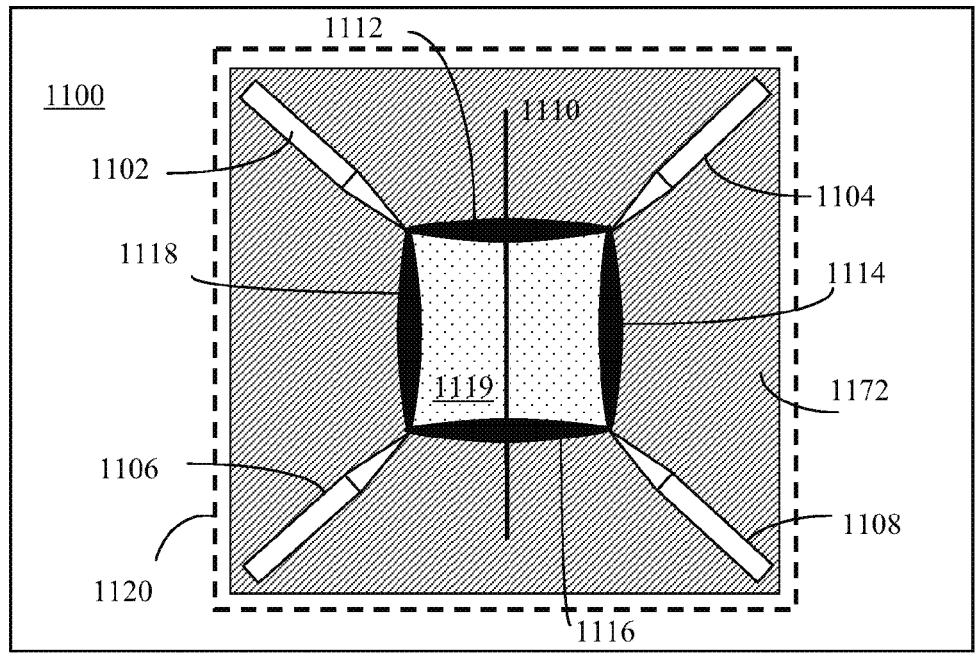
Figure 11D:
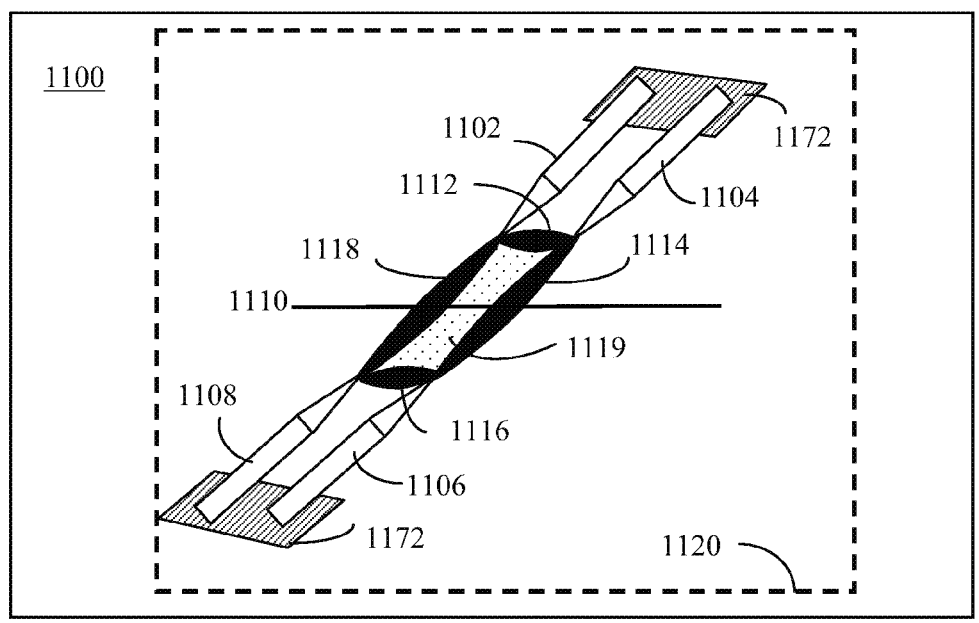
Figure 11E:
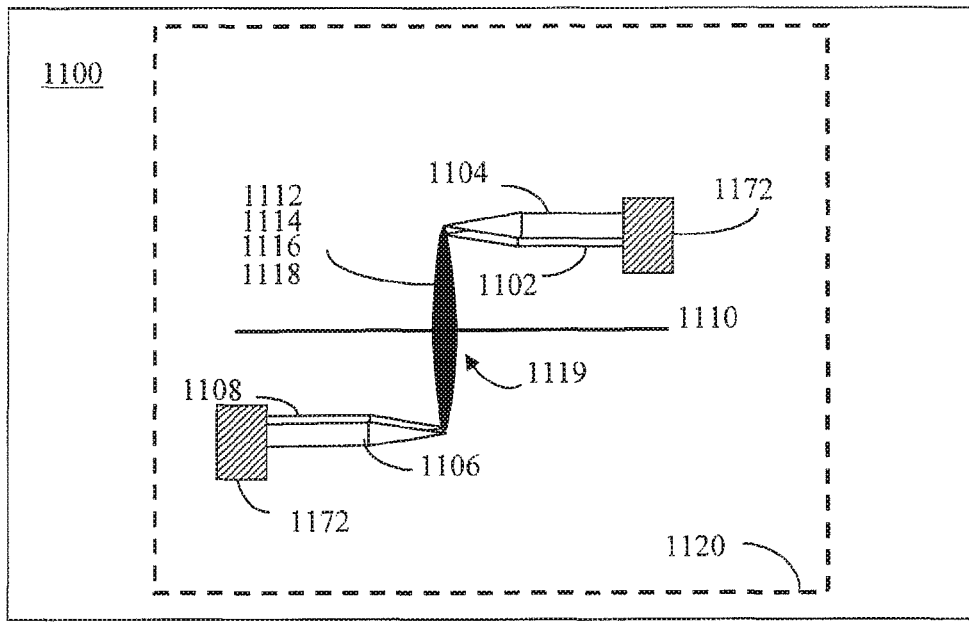

In FIG. 11A the fiber 1110 is oriented orthogonally with respect to the electrodes and in FIG. 11B the fiber 1110 is oriented in parallel with the electrodes. In FIG. 11C the electrodes are oriented in a cross ("X") arrangement. In FIG. 11D the electrodes are arranged diagonally with respect to the fiber 1110. In FIG. 11E pairs of electrodes are oriented in different planes and the fiber is oriented in a third plane that passes between the planes within which the electrodes are oriented. In the embodiments of FIGS. 11A-D, the electrodes can all be in the same plane. In the embodiments of FIGS. 11A-C, the fiber may be in the same plane as the electrodes or proximate to the plane of the electrodes.

Figure 11F:
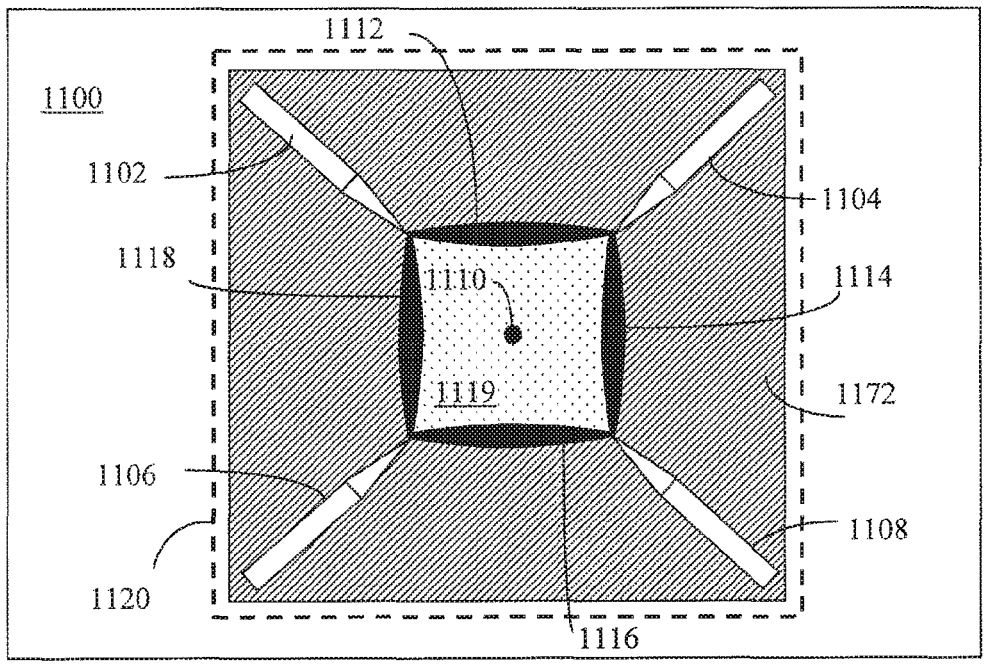
Figure 11G:
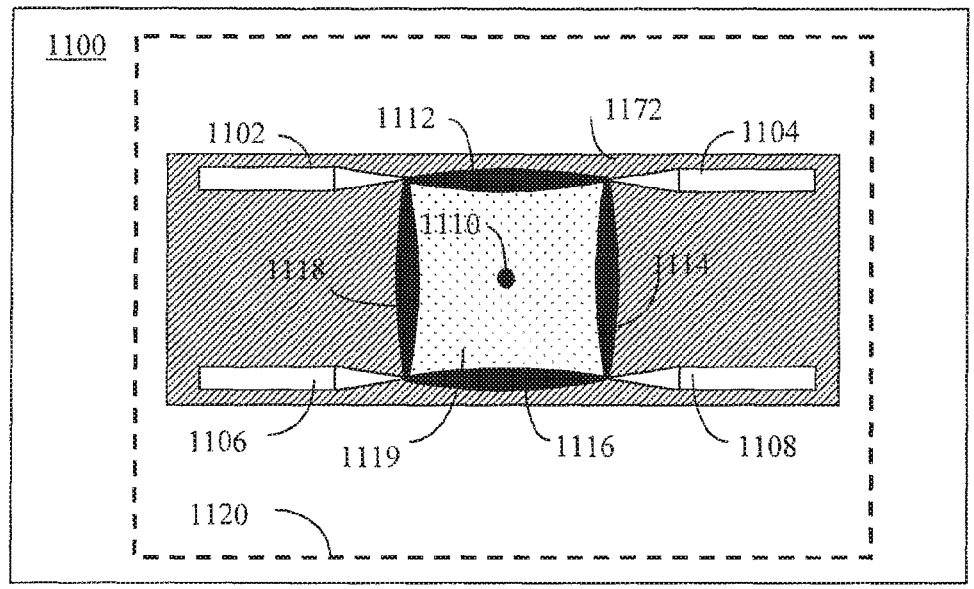
Figure 11H:
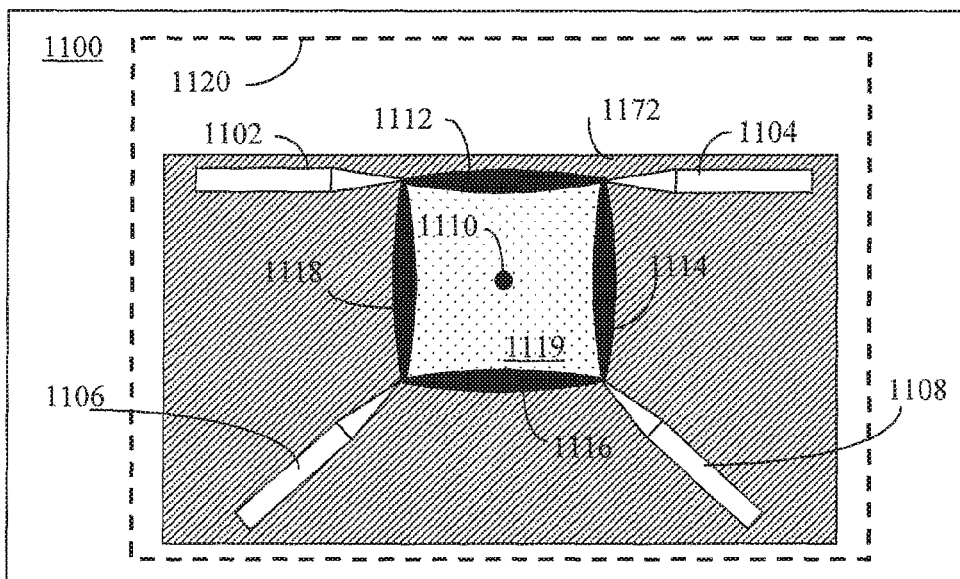

In any of the embodiments shown in FIGS. 11A-11E, fiber 1110 could be arranged as if it were coming out of the page, e.g., substantially perpendicular to the page and field 1119. As an example, FIG. 11F shows the embodiment of FIG. 11C where fiber 1110 is coming out of the page. FIG. 11G shows the embodiment of FIG. 11A or 11B where fiber 1110 is coming out of the page. And FIG. 11H shows the embodiment where electrodes 1102 and 1104 are aligned and electrodes 1106 and 1108 are angled, and fiber 1110 is coming out of the page. The embodiment of FIG. 11H could also be used with fiber 1110 crossing arcs 1112 and 1116, 1114 and 1118, or in some other arrangement.

These are only examples of possible alternative arrangements of the electrodes and fiber. The present invention lends itself to a wide variety of arrangements, due to its unique capability of maintaining a plurality of controlled arc discharges. In any of the three electrode embodiments, the circuit of FIG. 5 or 7 could be used to drive such electrodes.

While the foregoing has described what are considered to be the best mode and/or other preferred embodiments, it is understood that various modifications can be made therein and that the invention or inventions can be implemented in various forms and embodiments, and that they can be applied in numerous applications, only some of which have been described herein. It is intended by the following claims to claim that which is literally described and all equivalents thereto, including all modifications and variations that fall within the scope of each claim.

What is claimed is:

1. A multi-electrode system, comprising:
   at least one fiber holder arranged to hold at least one optical fiber along a fiber axis;
   a plurality of electrodes arranged to generate a uniform heated field; and
   a vibration mechanism arranged to vibrate at least one of the electrodes with an oscillation period shorter than a thermal time constant of the at least one optical fiber to generate a uniform heated field encompassing the at least one optical fiber, wherein the uniform heated field is broadened in a direction along an axis of the at least one optical fiber.

2. The system of claim 1, further comprising:
   a vacuum chamber arranged to maintain a partial vacuum, wherein the plurality of electrodes are disposed within the vacuum chamber.

3. The system of claim 1, wherein the plurality of electrodes is 2 electrodes.

4. The system of claim 1, wherein the plurality of electrodes is 3 electrodes.

5. The system of claim 1, wherein the at least one optical fiber has a diameter in a range of from about 200 μm to about 600 μm.

6. The system of claim 2, wherein the partial vacuum is an oxygen-enriched partial vacuum.

7. The system of claim 1, wherein the plurality of electrodes are arranged around the axis.

8. The system of claim 1, wherein the plurality of electrodes are arranged in a horizontal plane spaced apart from the axis.

9. The system of claim 8, wherein the at least one optical fiber is held above the horizontal plane of the spaced apart electrodes.

10. The multi-electrode system of claim 1, wherein the heated field is a plasma field.

11. The multi-electrode system of claim 1, further comprising:
    a control circuit electrically coupled to the plurality of electrodes and configured to drive the plurality of electrodes in a rotating phase sequence to generate at least one arc that pulses on and off to form a substantially uniform heated field around the at least one optical fiber.

12. The multi-electrode system of claim 11, wherein the electrodes are arranged to generate plasma arcs between adjacent electrodes, with an oscillation period shorter than a thermal time constant of the at least one optical fiber.

13. An optical fiber splicer, comprising:
    at least one fiber holder arranged to hold and abut endfaces of at least two optical fibers;
    a plurality of electrodes arranged to generate a uniform heated field; and
    a vibration mechanism arranged to vibrate at least one electrode with an oscillation period shorter than a thermal time constant of the at least one optical fiber to generate a uniform heated field encompassing the at least two optical fibers wherein the uniform heated field is broadened in a direction along axes of the at least two optical fibers.

14. The multi-electrode system of claim 13, wherein the plurality of electrodes are arranged around the axis.

15. The multi-electrode system of claim 13, wherein the plurality of electrodes are arranged in a horizontal plane spaced apart from the axis.

16. The multi-electrode system of claim 15, wherein the at least two optical fiber are held above the horizontal plane of the electrodes.

17. The multi-electrode system of claim 13, further comprising:
   a vacuum chamber arranged to maintain a partial vacuum, wherein the plurality of electrodes are disposed within the vacuum chamber.

18. The multi-electrode system of claim 17, wherein the partial vacuum is an oxygen-enriched partial vacuum.

* * * * *